Sept. 20, 1966   E. L. RAMER   3,273,664
REMOTE AUTOMATIC CONTROL OF POWER DRIVEN EQUIPMENT
Filed Dec. 12, 1963   2 Sheets-Sheet 1
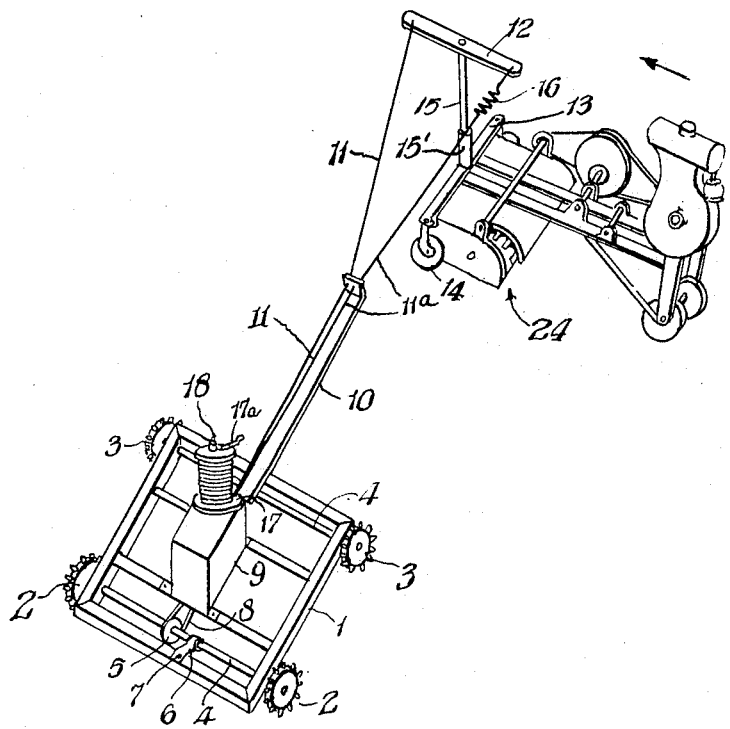
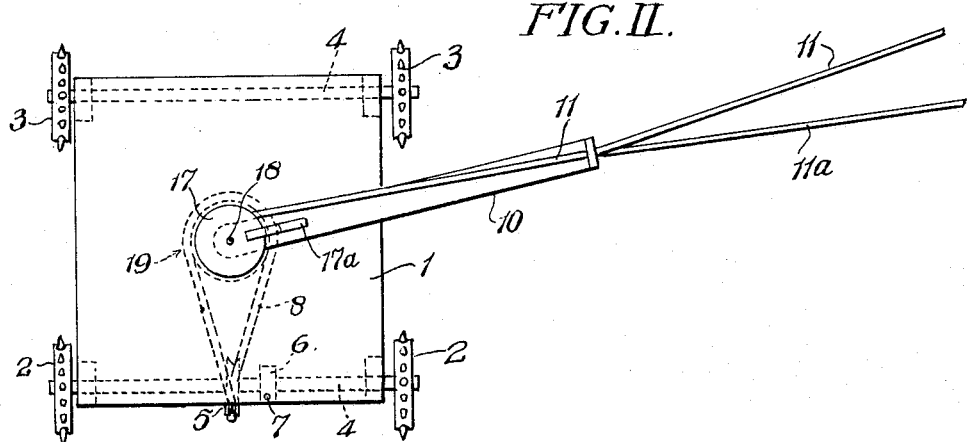
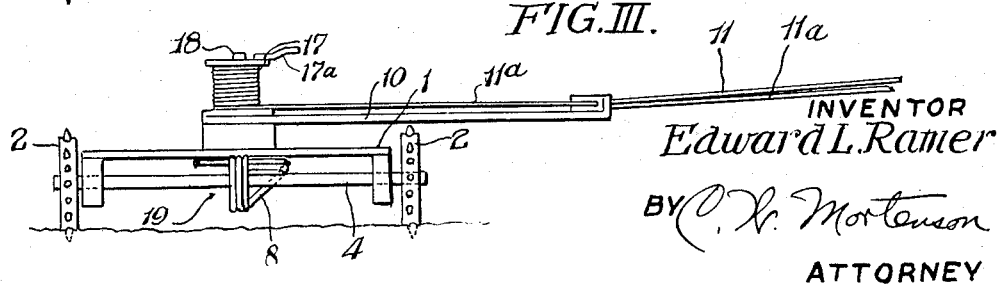
INVENTOR
Edward L. Ramer
BY
ATTORNEY

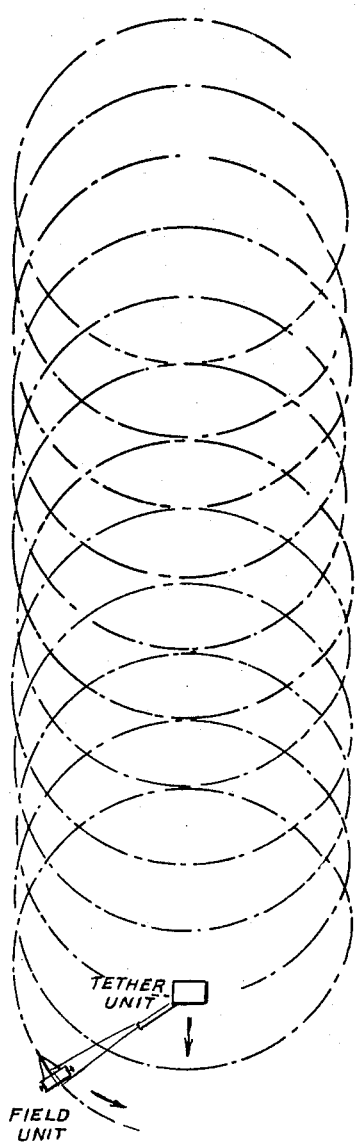
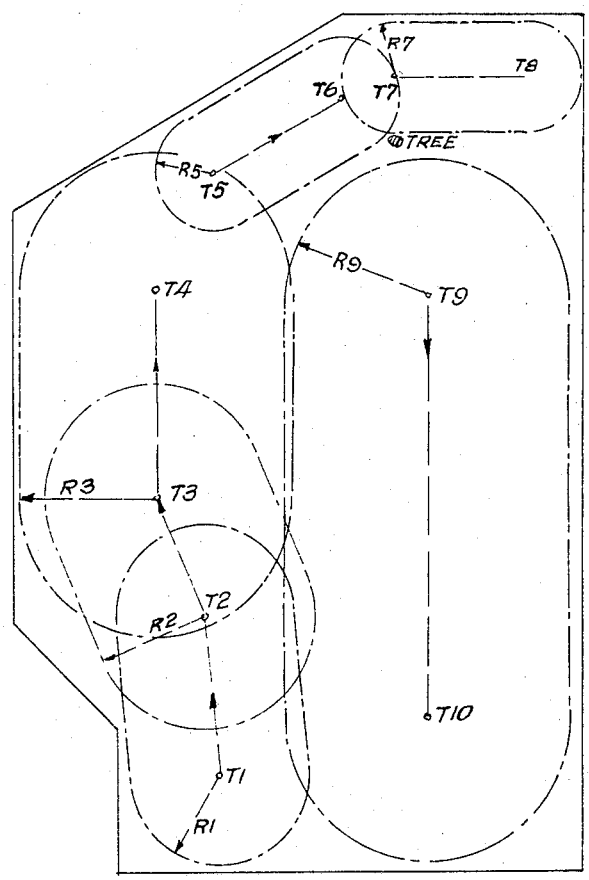
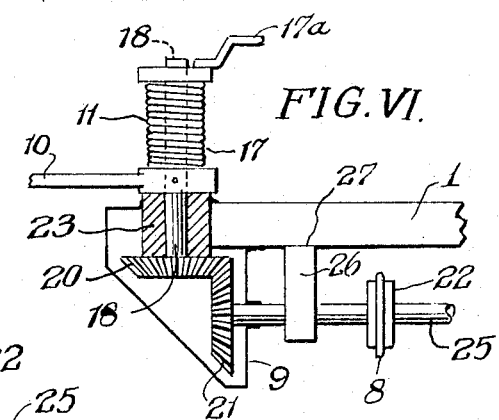
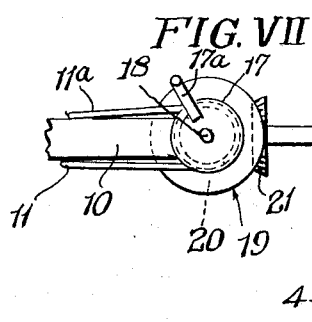

United States Patent Office 3,273,664
Patented Sept. 20, 1966

3,273,664
REMOTE AUTOMATIC CONTROL OF POWER
DRIVEN EQUIPMENT
Edward L. Ramer, Hockessin, Del., deceased; Mildred A.
Ramer, executrix, Hockessin, Del.
Filed Dec. 12, 1963, Ser. No. 330,163
16 Claims. (Cl. 180—79)

This invention relates to remote automatic control of power utilization as applied to the lawn mowers and similar working equipment, such as harvesting machinery.

In the past, lawn mowing, harvesting, fertilizing and other field operations have generally required the immediate presence of an operator, even though the equipment be power driven. Remote control guidance systems have been developed, but these are at best only semi-automatic since they still require constant attention by an operator even though he be stationed at a remote control point. These guidance systems, although an improvement over earlier methods, do not provide the desired essentially fully automatic control for operation of lawn mowers and related field equipment. The present invention affords important improvements in the operation of such equipment wherein the attention of the operator is at most only intermittent and kept to a minimum.

This invention has as a principal object the mechanical or electrical automation of power driven lawn mowing or harvesting equipment whereby the attention of the operator is reduced to a minimum. Another object is the provision of a system for the application of automatic power to lawn mowing and harvesting which is positive and efficient in its operation and which may be operated for different patterns, for example, circular, elliptical, almost square or rectangular. Another object is the provision of a control unit which is mobile and which is propelled and directed by means within itself. Another object is the provision of a mobile control unit which automatically controls and guides the mower or harvester unit to operate in the desired predetermined pattern. A further object of the invention is the provision of an automated control system which provides corrective deflection of the guide wheel or other guidance means on the mowing or harvesting equipment, over uneven terrain, ruts or obstructions so that the effects of such distractions are eliminated. A further object is the provision of a mobile control unit which is simple and durable in its construction and which requires little maintainence. Other aims will be noted below.

These objects are accomplished by means of a combination of components, chief of which is an automatically propelled mobile control unit, hereinafter designated as the control or tether unit, connected with and controlling a mowing or working unit, hereinafter designated as the field or working unit, by means of adjustable guide lines, one of which includes a tension means to assist in controlling the predetermined path of the working unit. The principles of this invention can be applied to controlling the movement of a variety of moving objects that move on land, in the air or in water, such as, for example, lawn mowers, tractors, harvesting equipment, waxers, sanders, airplanes, boats, dredges and the like. The control unit in each instance has a connection running to and controlling the movement of the steering mechanism of the moving object be they rudders, paddles, wheels and the like. In each case there is coordinated control so that the movement of the working object and of the moving control unit are synchronized and remain so during the operation of the system.

The invention will be further understood by the following description and reference to the drawings which show one embodiment of the invention for illustrative but not limitative purposes, the drawings including the following:

FIGURE I is a perspective plan view of the tether unit and the field unit (lawn mower) components joined by means of adjustable guide lines and illustrates the essential parts and features of each component.

FIGURE II is a partial top view of the tether unit showing in detail one arrangement of a driving means, a V-belt system, for automatically propelling the control unit during operation of the system.

FIGURE III is a partial end view of the tether unit showing the arrangement of the said driving means and particularly the detail for the belt arrangement for propelling the rear wheels of the frame upon which the driving mechanism of the tether is mounted.

FIGURE IV illustrates a typical cutting pattern of the moving tether unit and field unit (lawn mower) set and controlled for circular movement of the field unit with forward movement of the tether unit.

FIGURE V illustrates other typical cutting patterns which may be achieved for operations over uneven terrain or to avoid obstalces such as trees, building, etc.

FIGURE VI illustrates the horizontal and vertical co-acting gear assembly fitted with a sprocket wheel and connected with a rotatable horizontal arm which comprises an essential part of the power train of the tether unit in one embodiment of the invention.

FIGURE VII is a top plan view of the essential parts of the power train showing the driving gear arrangement coupled to a sprocket wheel which is connected with a second sprocket wheel by means of a chain belt, the second sprocket wheel being also attached to the axle of the driving wheels which are in contact with the ground.

In the drawings, in FIGURE I the working unit and the control unit are shown in working relationship, and in the tether unit 1 is a frame to which is attached two driving wheels 2 generally provided with teeth or other means to prevent slippage, and co-acting with these wheels are two non-driving, supporting wheels 3. Axles for the wheels are shown by 4, the axle containing the driving sprocket or belt sheaves, as the case may be, 5 also being supported by strap 6 attached to the supporting frame at 7. Usually axle 4 is sufficiently heavy so that support 6 is generally not needed. A belt 8 actuates the driving sheaves 5 or if a chain and sprocket mechanism is used it is actuated through a gear mechanism within housing 9 as shown in FIGURES VI and VII. For convenience two different driving means are shown. FIGURE III shows a V-belt arrangement; FIGURE VII shows a chain-sprocket mechanism. Both are driven, in effect, by vertical shaft 18 which, for the sprocket and chain modification, turns gears in housing 9, the shaft 18 being rotated by the working unit and which, for the belt driven unit, drives a sheave co-acting with a second sheave on axle 4.

Housing 9 contains a gear mechanism 19 (see FIGURE VI) actuated by rotatable arm 10 through which are threaded guide lines 11 and 11a. The guide lines are attached to the extremities of a horizontal guide arm 12 on the working unit 24 which arm is joined to the bar 13 of the steering assembly including wheels 14 of the said unit, through vertical bar 15. The connection of rod 15 to bar 13 can be conventional steering connection, and is generally the simple steering gear arrangement. Arm 12 is, in effect, like the steering bar of a sled, but it is attached through steering mechanisms 15 and 15' (which can be rods or gears) which move the bar 13. This movement turns guiding wheels 14. Arm 12 is in a position parallel to the direction of travel of the working unit. As can be seen in FIGURE I, arm 12 has a right-hand turning part and a left-hand turning part each having tied to it one of the lines 11 or 11a which lines control, in part, the turning.

Rotatable arm 10 on the control unit is connected to a vertical shaft 18 centered through reel 17 and is connected, as shown in FIGURE VI, with a beveled horizontal/vertical gear assembly contained in housing 9 of conventional design with a sprocket wheel 22 attached to the vertical gear 21, driven by gear 20, and carrying a chain belt 8 as shown in FIGURE VII, to transmit power through the chain drive for forward movement of the tether unit.

Guide line 11a which is normally the rear guide line includes a spring 16 to provide tension to assist in directing the movement of the field unit. A ratcheted reel 17 is mounted on housing 9 to provide means for pre-selection of any desired length of guide lines 11 and 11a, through a ratchet arm lock, not shown. Element 17a, shown in FIGURE VI, is a hand crank for rotating the take-up reel.

As explained, rotatable vertical shaft 18 is attached to guide arm 10 and also at its lower extremity to a conventional horizontal and vertical gear assembly 19 or belt system which transmits power resulting from the movement of the field unit around the tether unit to the drive mechanism that provides forward movement to the tether unit.

With reference to FIGURE VI, the gear, chain and sprocket assembly contained in housing 9 is shown, and as explained, horizontal beveled gear 20 co-acts with vertical beveled gear 21. As can be seen in FIGURE VI, gear 21 is joined through a common axle 25 with sprocket wheel 22, shaft 25 being supported by bearing 26 which is in turn mounted on frame 1 at 27. It is to be appreciated that axle 25 and axle 4 are parallel, the sprocket wheels 22 and 5 carrying the chain belt 8. Also, in the V-belt modification one will understand that there is a V-belt sheave on the center vertical shaft and a V-belt sheave on the driving horizontal shaft and that the V-belt has the conventional twist in it to effect the direction change.

The horizontal gear 20 is connected with vertical rotatable shaft 18 partially enclosed by bearing 23, shaft 18 extending through reel 17 and being connected with rotating guide arm 10 carrying guide lines 11 and 11a, as explained above.

In operating the system, guide lines 11 and 11a are set at the length to give the desired arc of travel of the field unit by adjustment by means of reel 17. With the guide lines made taut by the desired placement of its two units, the mower is started on a forward path being driven by a conventional electrical or gasoline motor. Guide line 11 sets the radius of the circular path of the field unit. Steering arm 12 is turned as indicated to guide the unit in a counter-clockwise direction. Guide line 11a, rearward of guide line 11, has a corrective aid comprising, in a simple and convenient form, a coil spring 16 at a tension of, for example of 10 pounds, and it functions as the field unit moves forward to direct the steering assembly and cause the field unit to move out from the tether unit. Upon reaching the circle radius determined by the length of the front guide 11, the field unit circles on this radius but tries to head outward due to the setting of the steering assembly, and it is held in this position by the pull of the spring in guide line 11a. If, due to a bump, change in ground pitch or other irregularity, the front line 11 slackens and the field unit tends, therefore, to move closer to the tether unit than it should be, or it starts to run in a tighter circle, an increasing spring tension in the rear guide line 11a takes the slack out of line 11 and redirects the steering assembly to force the field unit back to its normal radius position. Since line 11 is of a fixed length, it prevents line 11a from pulling its end of bar 12 toward the control unit. Guide bar or steering bar 12 during operations is always in a position substantially parallel to the line of direction which the working unit 24 is travelling and also nearly perpendicular to the guide lines 11 and 11a. Further, it will be appreciated that reel 17 rotates with the working unit. There is no winding up or unwinding of the lines on reel 17 once the device is set and operating. This reel merely turns slowly in timing with the circular travel of the working unit so that reel 17 serves as a convenient storage place for excess line. Reel 17 may be mounted elsewhere, if desired, for example, on horizontal arm 10.

As described above, the tether unit in its simplest form is mechanically powered solely by the field unit by the mechanical forces or vector provided through the guide lines connected with the field unit moving in its controlled radius. This is accomplished by means of a horizontally rotatable arm 10 which may, for example, be about 3 feet in length, and which is caused to rotate by the forward movement of the field unit by its connection to the field unit through the guide lines 11 and 11a. This arm in rotating actuates a horizontal/vertical gear assembly 19 which in turn operates driving sprocket wheel 5 through chain belt 8 thus causing the tether unit to move always forward in a substantially straight line while the field unit moves in a spirally circular track as illustrated in FIGURE IV even though the working unit periodically gets in back of the control unit. In operating the system for a semi-rectangular pattern the tether unit is set at T1 and pointed to proceed to T2. The field unit (lawn mower) is set at radius R and cuts uniform spiral circles around tether unit. Cutting proceeds in overlapping circles until tether unit reaches T2, being slowly driven there by power derived from the field unit.

In operating the several patterns shown in FIGURE V, the field unit (lawn mower) is set to cut at a constant radius R1 and cutting proceeds in overlapping circles until T2 is reached. At this point the tether unit is redirected toward T3 and a new cutting radius of R2 is set. Cutting proceeds until the tether unit moves forward to T3. Again its direction is shifted to point to T4 and new radius R3 is set.

When the tether unit reaches T4, it is moved to T5 with narrower cutting radius R5, and proceeds to T6. To cut past a tree a new starting position T7 and a new cutting radius R7 causes cutting to proceed to T8. The tether unit is moved to T9 and with final cutting radius R9 proceeds to T10.

The smallest cutting radius may be as little as 3 feet and the largest radius may be 100 feet or more. The cutting radius may be changed while the unit is operating and the direction of the tether unit may also be changed while it is moving. This is done simply by manually letting out line from or winding up line on reel 17, as desired. The reel 17 is generally equipped with a conventional cam lock so that winding or unwinding is easily done. To change the direction of the tether unit it is simply picked up and set down again in the desired position, as it is very light.

If desired, the tether unit may be independently powered by gasoline or electric motor and its movement and direction controlled electronically by remote electric controls, by wires, stakes or other suitable means.

The field unit which may be a lawn mower or a harvesting equipment unit or any powered units driven indoors or outdoors is powered by conventional gasoline or electric motors. Its steering mechanism which is directed and controlled by guidance arms connected with the tether unit as described above may consist of a front wheel steering arrangement as shown in FIGURE I or it may consist of a swivel wheel attached to and supporting the rear of the field unit, a steering device which is commonly used in equipment of this type.

If special patterns or directions are desired of either or both the tether unit and field unit, such as illustrated in FIGURE V, automatic, preset, or manual controls or signals can be used. The power to drive the tether unit may come from the field unit by mechanical or electrical means or there may be a separate or auxiliary power unit on the tether unit, either with the desired controls built into it or the control signals supplied from the outside.

The above description and related drawings provide detail for an illustrative mechanical means for movement of the tether unit through a power train consisting of a gear assembly coupled with the transmisison of power through a chain belt operating suitably placed sprocket wheels or an equivalent thereof, the basic power source being derived through the movement of the field unit. Other satisfactory power transfer methods include a hydraulic system with fluid drive and motor, electrical systems with generator and motor, magnetic coupling devices, cranks and coupling arm, direct coupling wherein a driving wheel is connected directly on the horizontal frame axle with the driving wheel touching the ground and direct coupling where the driving wheel is connected directly on the vertical shaft but coupled to give one side contact with the ground.

As an example of a simple mechanical control means built into the tether unit, a cam plate is supported near a steering or guiding wheel on the ground. Driving power from the movement of the tether mechanical drive system causes the cam surfaces to move the steering wheel at the desired time and rate. In this example, the steering wheel may be set for straight ahead direction for 40 feet. At this point the cam motion starts a steering wheel movement so that a right angle direction is slowly accomplished by the tether unit after the desired number of rotations of the horizontal tether unit arm. The cam action then causes the steering wheel to go straight ahead again for a predetermined distance.

If it is desired to change automatically the radius on which the field unit is circling, a winch mounted on the horizontal tether arm or tether unit is caused to pay out or take up the two guide lines. This may be accomplished by mechanical or electrical sequences on the tether unit set in predetermined pattern or may come from electrical signals generated through markers in the area.

By proper combination of central actions on the tether unit, the field unit can be made to travel in a circular, elliptical, nearly square or rectangular pattern as illustrated in FIGURE V. A safety or stopping system may be incorporated in the field unit so that if it runs into or approaches an obstruction too closely, a sensing device will cause the unit to stop or shut off.

The equipment and system of operation of the present invention provide a highly useful and greatly improved means for lawn mowing, harvesting and the like whereby these operations are simplified and function substantially by reliable automation so that very little attention is required by an operator.

While the invention has been disclosed herein in connection with certain embodiments and certain structural and procedural details, it is clear that changes, modifications or equivalents can be used by those skilled in the art; accordingly, such changes within the principles of this invention are intended to be included within the scope of the claims below.

I claim:

1. A system for lawn mowing, harvesting and the like comprising as essential components thereof a control unit and at least one field unit having a steering mechanism movably mounted on said field unit to afford a right-hand steering part and a left-hand steering part, said control unit comprising a vehicular framework supported by wheels and axles for said wheels, one of said axles being equipped with means for propelling the framework through a power train connected with a horizontal continuously rotatable arm which is attached at one end to a vertical shaft mounted on said framework and connected also to the steering mechanism of a powered field unit by means of two guide lines one of which is connected to the said right-hand steering part and the other of which is connected to the said left-hand steering part and, said power train being actuated by the continuously rotation of the horizontal arm resulting from the forward movement of the field unit.

2. Apparatus for continuously guiding a moving, self-propelled object containing guiding means movable with the means to steer the said object and having a right hand turning part and a left hand turning part to afford its being steered by a control unit which is connected to said guiding means of said object but which moves in a path different from said object which apparatus comprises a continuously moving control unit connected to said guiding means; a co-acting moving object traveling in a predetermined course and containing means for the object's propulsion; a control and continuous power transfer connection between said unit and said object comprising two lines connected at one end to the guiding means of said moving object and connected at the other end to said unit; in said unit and receiving continuous moving force through said connection, a means for translating said force to forces that effect movement of said unit which means comprises a shaft in said unit rotated by the movement of said moving object and transmission means to translate the movement of said shaft into forward movement of said unit; and control means to keep said moving object on its said course.

3. Apparatus in accordance with claim 2 in which one of said two lines is connected to the left hand turning part of the said guiding means and the other of said two lines is connected to the right hand turning part of the said guiding means and one of said lines has a tension spring tied into it as a part of the line, said spring being located between the said control unit and one of said turning parts.

4. A control unit for controlling a moving, self-propelled object having a steering mechanism containing means to be connected to two guide lines in the control unit and to be steered thereby in a predetermined course different from that of the control unit which control unit comprises a vehicular framework connected to wheels through horizontal axles, at least one of said axles bearing means for propelling the framework through a power train driven by a rotatable shaft which is supported by said framework and which supports a horizontal arm which is rotatably mounted on said control unit to move repetitively in complete circles and which in turn rotates said shaft when said arm is rotated; and two guide lines connected to said arm, each line being connectable at its other end to said steering mechanism of said moving object to be in force receiving relationship with said moving object, said force rotating said arm through said lines when said object is moving.

5. Apparatus for continuously guiding a moving self-propelled object containing a steering means which contains an element having a right-hand steering part and a left-hand steering part which element is movably mounted on said object to afford connecting means for steering by a mechanical control unit which is connected to the said right-hand steering part and the said left-hand steering part of the said steering means of said object to steer it but which moves in a path different from said object which apparatus comprises a continuously moving control unit connected to said steering means of said object; a co-acting moving object containing means for its propulsion and said means for its said steering and said connecting means and movable steering parts; control connection and continuous power transfer connection between said unit and said steering parts of said self-propelled object; means in said unit for receiving continuous moving force through said control connection from said object; and means in said unit for translating said force received to forces that effect movement of said unit and that stabilize the control of the movement of said object.

6. Apparatus in accordance with claim 5 which contains two lines one of which is connected at one end to the said right-hand steering part and the other of which is connected at one end to the left-hand steering part in said steering means of said object and both of which are connected at the other end to the said continuous force receiving means in said control unit, said lines affording said control connection and said power transfer connection.

7. Apparatus in accordance with claim 6 in which one of said connecting lines contains a coil spring as an operative continuous control part, being located in the line between the said control unit and the said steering part in said co-acting moving object to which the line is attached.

8. Apparatus in accordance with claim 5 in which said translating means in said unit comprises a continuously rotating vertical shaft rotated by the movement of said moving object and transmission means to translate the resultant rotation of the shaft into continuously forward movement of said unit.

9. Apparatus in accordance with claim 8 in which said transmission means comprises a V-belt sheave assembly on the vertical rotating shaft connected with a second sheave located on drive axle on said unit.

10. Apparatus in accordance with claim 8 in which said transmission means comprises a horizontal and vertical co-acting gear assembly rotated by said shaft and connected with said assembly a sprocket wheel carrying a chain belt connected with a second sprocket wheel connected with a drive axle on said unit.

11. Apparatus for guiding a moving, self-propelled object containing a power means for propelling it and a steering means containing a right-hand steering part and a left-hand steering part and being movably mounted on said object to afford steering by a mechanical control unit which is connected to the said steering means of said object but which moves in a path different from said object which apparatus comprises a continuously moving control unit component connected to said right-hand steering part and said left-hand steering part of said steering means of said object; a co-acting, responding moving object which contains said steering means and a power means for propelling it; and connections between said unit and said right-hand steering part and said left-hand steering part contained in said object for control purposes, said unit containing a power train comprising a means for continuously transmitting force received from said object to a means in said unit for continuously propelling said unit.

12. A control unit adapted to control continuously and direct a moving, self-propelled object containing a steering means movably mounted on said object to afford steering by a control unit which is connected to the said steering means of said object but which moves in a path different from said object which unit comprises a vehicular framework connected to wheels through horizontal axles, at least one of said axles bearing means for propelling the framework through a power train connected with a horizontal continuously rotatable arm attached to a vertical shaft which is mounted on said framework and which is adapted to be continuously rotated by said moving object, the said continuously rotatable horizontal arm being connected to said moving object through a plurality of guide lines and the said guide lines being attached to a ratcheted, lockable reel which is held in place but rotates with said horizontal arm to maintain a predetermined length of line for connection to said moving object.

13. A unit in accordance with claim 12 in which the said reel is centered on the said vertical shaft carrying the horizontal rotatable arm.

14. A unit in accordance with claim 12 in which the said reel is positioned on the said rotatable arm.

15. A unit in accordance with claim 12 in which one of said guide lines includes, as a continuing part of the given line, a means for providing control tension.

16. A unit in accordance with claim 15 wherein the tension means comprises a spring forming part of the guide line, said spring being located between the said unit and the said steering means of said object.

References Cited by the Examiner

UNITED STATES PATENTS

| | | | |
|---|---|---|---|
| 2,259,193 | 10/1941 | Andrew | 180—79 |
| 2,796,944 | 6/1957 | Clement | 180—79 |

FOREIGN PATENTS

| | | |
|---|---|---|
| 857,834 | 1/1961 | Great Britain. |
| 909,533 | 10/1962 | Great Britain. |

KENNETH H. BETTS, *Primary Examiner.*

A. HARRY LEVY, BENJAMIN HERSH, *Examiners.*

E. E. PORTER, *Assistant Examiner.*